US010776955B2

(12) United States Patent
Difato et al.

(10) Patent No.: US 10,776,955 B2
(45) Date of Patent: Sep. 15, 2020

(54) METHOD FOR THE ANALYSIS OF SPATIAL AND TEMPORAL INFORMATION OF SAMPLES BY MEANS OF OPTICAL MICROSCOPY

(71) Applicant: Fondazione Istituto Italiano di Tecnologia, Genoa (IT)

(72) Inventors: Francesco Difato, Genoa (IT); Monica Moroni, Castellanza (IT); Gemma Palazzolo, Genoa (IT); Alessandro Soloperto, Sava (IT)

(*) Notice: Subject to any disclaimer, the term of this patent is extended or adjusted under 35 U.S.C. 154(b) by 0 days.

(21) Appl. No.: 16/335,241

(22) PCT Filed: Sep. 15, 2017

(86) PCT No.: PCT/IB2017/055604
§ 371 (c)(1),
(2) Date: Mar. 20, 2019

(87) PCT Pub. No.: WO2018/060806
PCT Pub. Date: Apr. 5, 2018

(65) Prior Publication Data
US 2019/0251706 A1    Aug. 15, 2019

(30) Foreign Application Priority Data
Sep. 29, 2016    (IT) .................. 102016000097811

(51) Int. Cl.
*G06T 7/00*    (2017.01)
*G06T 7/50*    (2017.01)
(Continued)

(52) U.S. Cl.
CPC ............. *G06T 7/97* (2017.01); *G02B 21/008* (2013.01); *G02B 21/0036* (2013.01); *G02F 1/29* (2013.01);
(Continued)

(58) Field of Classification Search
CPC ..... G02B 21/0036; G02B 21/008; G02F 1/29; G06T 7/97; G06T 7/70; G06T 5/50
(Continued)

(56) References Cited

U.S. PATENT DOCUMENTS

2017/0176338 A1* 6/2017 Wu .......................... G02F 1/29
2017/0363849 A1* 12/2017 Doric ................. G02B 13/0095

FOREIGN PATENT DOCUMENTS

DE    102008049878    4/2010
WO    2009023635    2/2009

OTHER PUBLICATIONS

Florian O. Fahrbach et al., Rapid 3D light-street microscopy with a tunable lens, Optics Express, col. 21, No. 18, Aug. 30, 2013, p. 21010 Abstract; fig. 1; par. [001], [002], [006].

(Continued)

*Primary Examiner* — Thai Q Tran
*Assistant Examiner* — Syed Y Hasan
(74) *Attorney, Agent, or Firm* — Themis Law

(57) ABSTRACT

A method for analyzing spatial and temporal information of samples using optical microscopy includes choosing a field of view in a sample; scanning the sample by applying an electrical signal having a first frequency to an electrically tunable liquid lens in the detection path, performing a sequential acquisition, at a first acquisition frequency higher than the first frequency of the electrical signal, of a stack of images placed on different in-focus planes; processing the stack of images to identify the position of one or more regions of interest; scanning the sample by applying the electrical signal having a second frequency to the tunable lens, performing a sequential acquisition, at a second acquisition frequency lower than the second frequency of the electrical signal, of a temporal series of images with extended depth of field; and calculating the mean intensity (Continued)

of each region of interest for each image of the temporal series.

10 Claims, 5 Drawing Sheets

(51) Int. Cl.
*G06T 7/70* (2017.01)
*G02B 21/00* (2006.01)
*G02F 1/29* (2006.01)
*G06T 5/50* (2006.01)

(52) U.S. Cl.
CPC .................. *G06T 5/50* (2013.01); *G06T 7/70* (2017.01); *G06T 2207/10056* (2013.01); *G06T 2207/10064* (2013.01); *G06T 2207/10148* (2013.01); *G06T 2207/20212* (2013.01); *G06T 2207/20221* (2013.01)

(58) Field of Classification Search
USPC .......................................................... 348/79
See application file for complete search history.

(56) References Cited

OTHER PUBLICATIONS

Sean Quirin et al., Instantaneous three-dimensional sensing using spatial light modulator illumination with extended depth of field imaging, Optics Express, vol. 21 No. 13, Jun. 27, 2013, p. 16007 Par. [0001], [0006].

\* cited by examiner

METHOD FOR THE ANALYSIS OF SPATIAL AND TEMPORAL INFORMATION OF SAMPLES BY MEANS OF OPTICAL MICROSCOPY

FIELD OF THE INVENTION

The present invention relates to a method for the analysis of spatial and temporal information of samples by means of optical microscopy.

BACKGROUND OF THE INVENTION

In optical microscopy field the need of investigating samples, even of substantial thickness, is known, such as for example biological samples. Regions of interest are typically present inside the biological sample, such as for example specific cells. Such regions of interest can exhibit, above all in case of live biological samples, changes over time of their own optical features, corresponding to specific behaviors of the sample, whose detection is of interest for a biological analysis of the sample. In these cases, optical microscopy has to be able to detect both spatial information of regions of interests, namely where they are arranged inside the three-dimensional space under examination of the sample, and temporal information, namely the trend over time of optical features of the regions of interest.

In this technical field the document "Instantaneous three-dimensional sensing using spatial light modulator illumination with extended depth of field imaging" (Sean Quirin, Darcy S. Peterka, and Rafael Yuste—Optics express 2013) discloses the sensing of spatial and temporal information about the sample by extended depth of field imaging. However spatial information is encoded on the basis of the particular configuration of the excitation path, that uses a two-photon system. Therefore, spatial information gets lost when using other excitation techniques. The document discloses the use of a micro-machined phase mask that provides a fixed phase modulation of the sensing path to have an extended depth of field. This means that the extended depth of field cannot be modified in amplitude, once the phase mask has been made and inserted. That is to say, this configuration does not allow the extension of the depth of field to be selected. The phase mask further induces aberrations in images that require deconvolution techniques to eliminate artifacts. Finally the extended depth-of-field acquisition method used does not include gathering spatial information of the sample in axial direction.

In the same technical field also the document "Rapid 3D light-sheet microscopy with a tunable lens" (Fahrbach et al. Optics express 2013) describes an analysis of spatial and temporal information of samples by optical microscopy. The document discloses a method using an electrically focus tunable liquid lens to perform a dynamic phase modulation in the reception path. Such lenses are currently known and available on the market and allow, by applying an electrical control signal, the curvature of the liquid to be controlled and therefore the focal length to be changed. This allows an arbitrary plane to be focused within a three-dimensional sample without moving any mechanical part of the system, and therefore allows a very rapid axial scanning of the detected in-focus plane to be performed without inertia. However, the document does not disclose the possibility of performing an extended depth of field imaging and therefore the method is limited in scan rate.

From the above it is clear that there is an unsatisfied need in prior art known methods for an optical microscopy method able to effectively obtain and analyse spatial and temporal information of samples, with high scan rates, with the possibility of setting the depth of investigation in the sample, and that does not require changes to the architecture of the used optical system.

SUMMARY OF THE INVENTION

These objects are pursued by the present invention that relates to a method for the analysis of spatial and temporal information of samples by optical microscopy comprising the following steps:

a) choosing a field of view in a sample;

b) scanning the sample in the axial direction by applying an electrical control signal having a first frequency to an electrically tunable liquid lens placed in the detection path, performing a sequential acquisition, at a first acquisition frequency which is higher than the first frequency of the electrical signal, of a stack of images placed on different in-focus planes;

c) processing the stack of images for identifying the position of one or more regions of interest in the three-dimensional space under examination of the sample;

d) scanning the sample in the axial direction by further applying the electrical signal having a second frequency to the tunable lens, performing a sequential acquisition, at a second acquisition frequency which is lower than the second frequency of the electrical signal, of a temporal series of images with extended depth of field;

e) calculating the mean intensity of each region of interest for each image of the temporal series.

The method therefore provides for using an electrically tunable liquid lens inserted in the reception optical configuration of a microscope, to perform without inertia a very fast axial scanning of the in-focus plane, obtaining speeds that cannot be reached by methods providing a motorized movement of components of the microscope such as for example the objective lens or the stage of the microscope. The method allows the speed and depth of the axial scanning to be controlled by the electrical control signal. This is carried out by a modulation of the focal length of the lens and therefore with a phase modulation of the reception optical path.

Once the selection of the field of view in the sample is carried out as in step a), step b) provides a slow axial scanning, where an image for each focused plane is acquired by a photosensitive detector, thus obtaining an axial stack, called as z-stack, of images of the sample. The stack of images is therefore processed in step c) to extract spatial information of the sample. Steps b) and c) thus allow the spatial configuration of the sample to be monitored and the three-dimensional position of the features within the sample to be extracted.

After obtaining spatial information, the method provides at step d) a fast axial scanning, such to gather optical signals from all the scanned planes, projecting them in a single image. Thus, an extended depth of field of the objective of the microscope is obtained, gathering signals from all the scanned planes, and thus generating an axial projection of the sample, to acquire in each single image of the series all the features comprised within the axial portion under examination of the sample. The calculation of the mean of the intensity of each region of interest for each image of the temporal series as in step e) allows generating a time-lapse to follow signal fluctuations associated with features arranged in the three-dimensional space within the acquired extended depth of field.

The method has many technical advantages. The speed for axially scanning the sample can be set by dynamic phase modulation. This allows two possible configurations to be used: slow axial scanning and fast axial scanning. The terms slow and fast are referred to the acquisition frequency of the photosensitive detector. The two configurations work in synergy to detect both spatial and temporal information of the sample. Moreover, the sample portion involved by the scanning can be arbitrarily defined, as well as the extension of the depth of field, by means of the dynamic phase modulation of the optical detection path carried out by the tunable lens and a synchronized image acquisition by the photosensitive detector. Finally, it is not necessary to change the system architecture to pass from one to the other configuration, by means of the dynamic phase modulation allowed by the tunable lens.

In one embodiment step c) comprises the following steps:
c1) projecting the stack of images into a single combined image;
c2) identifying in the combined image one or more regions of interest;
c3) calculating the mean intensity in each region of interest in each image of the stack and identifying the maximum value of mean intensity for each region of interest.

This allows firstly the position of the regions of interest to be defined in directions orthogonal to the axial direction and secondly their location in axial direction to be defined.

According to one embodiment, step b) is preceded by a calibration step comprising the following steps:
a1) applying the electrical signal to the tunable lens, which electrical signal is such that a scan of a sequence of in-focus planes is performed;
a2) visualizing by a user the sequence of in-focus planes;
a3) choosing by the user the limit in-focus planes of the scan;
a4) setting the corresponding voltage limit values of the electrical signal.

Calibration step allows the portion of the sample under examination to be set in axial direction. This is obtained by changing the electrical control signal applied to the tunable lens and contemporaneously visualizing the sample, such that it is possible to select and set the maximum and minimum voltage to be applied to the tunable lens, and therefore the limit in-focus planes of the scan.

According to an improvement there is provided the generation of a conversion factor from the voltage values of the electrical signal to the corresponding in-focus planes of the sequence, such that step c3) is followed by the following steps:
c4) associating for each region of interest the maximum value of mean intensity to a corresponding voltage value of the electrical signal;
c5) identifying for each region of interest the in-focus plane corresponding to the maximum value of mean intensity by applying the conversion factor to the associated voltage value of the electrical signal.

Preferably the generation of the conversion factor is carried out in the calibration step.

Thus it is possible to identify the voltage value of the electrical signal corresponding to the scan plane where the region of interest has the maximum mean intensity, and to convert such voltage value into the axial spatial coordinate by multiplying by the calculated conversion factor.

According to one embodiment in step b) the distance between in-focus planes corresponding to the images of the stack is defined by the examination depth of the sample, and by the number of acquisitions made during a whole sample scanning, which number of acquisitions is defined by setting the frequency of the electrical signal and the acquisition frequency respectively.

According to a further embodiment, the projection of the stack of images in a single combined image occurs by processing by software the stack of images.

According to a further embodiment one or more regions of interest in the combined image are identified by the binarization of the combined image according to a predetermined threshold.

The analysis of the image combined at step c1) and binarized according to the predetermined threshold therefore makes it possible to identify spatial coordinates perpendicular to the axial direction of the regions of interest. This, in combination with identifying the spatial coordinates along the axial direction described above, allows the position of each region of interest in the three-dimensional space under examination to be accurately identified.

In a further embodiment, in step d) the acquisition frequency is higher or equal to twice the frequency of the electrical signal.

Thus the in-focus plane moves between the limit planes at a frequency higher than the acquisition frequency such that the photosensitive detector substantially integrates in a single image information of all planes, in the one that can be described as a projection of the peaks of the three-dimensional portion under examination of the sample performed by hardware.

In one embodiment the duration of the acquisition at step d) is set by the following steps:
d1) setting the frequency of the electrical signal;
d2) setting the acquisition frequency;
d3) defining the number of images with extended depth of field of the temporal series.

Thus it is possible to decide the number of images to be acquired to compose the temporal series to define the duration of the time-lapse acquisition.

According to one embodiment, the optical microscopy procedure is of fluorescence type.

Optical fluorescence microscopy uses the fluorescence phenomenon, that is the ability of a material to emit light after absorbing light, as an alternative or in combination with reflection and absorption phenomena, to study properties of the material under examination. However the method can be applied to other types of optical microscopy, for example transmitted light microscopy.

According to one embodiment the optical microscopy procedure is of widefield type. In this type of procedure all the sample is contemporaneously illuminated in the three-dimensional space. In this case the method allows the configuration of the excitation path of the widefield system to be maintained unchanged, and it requires only small changes to the reception path. However the method can be applied to further configurations such as standard or two-photon illumination confocal microscopy implemented by phase masks or light spatial modulators, single plane illumination or structured illumination microscopy, oblique illumination microscopy.

BRIEF DESCRIPTION OF THE DRAWINGS

These and other characteristics and advantages of the present invention will be more clear from the following description of some non-limitative embodiments shown in annexed drawings where.

DETAILED DESCRIPTION OF EMBODIMENTS OF THE INVENTION

The method of the present invention uses an electrically focused tunable liquid lens to perform a dynamic phase modulation in the reception path of an optical microscopy device, preferably by widefield architecture.

Figure 9:
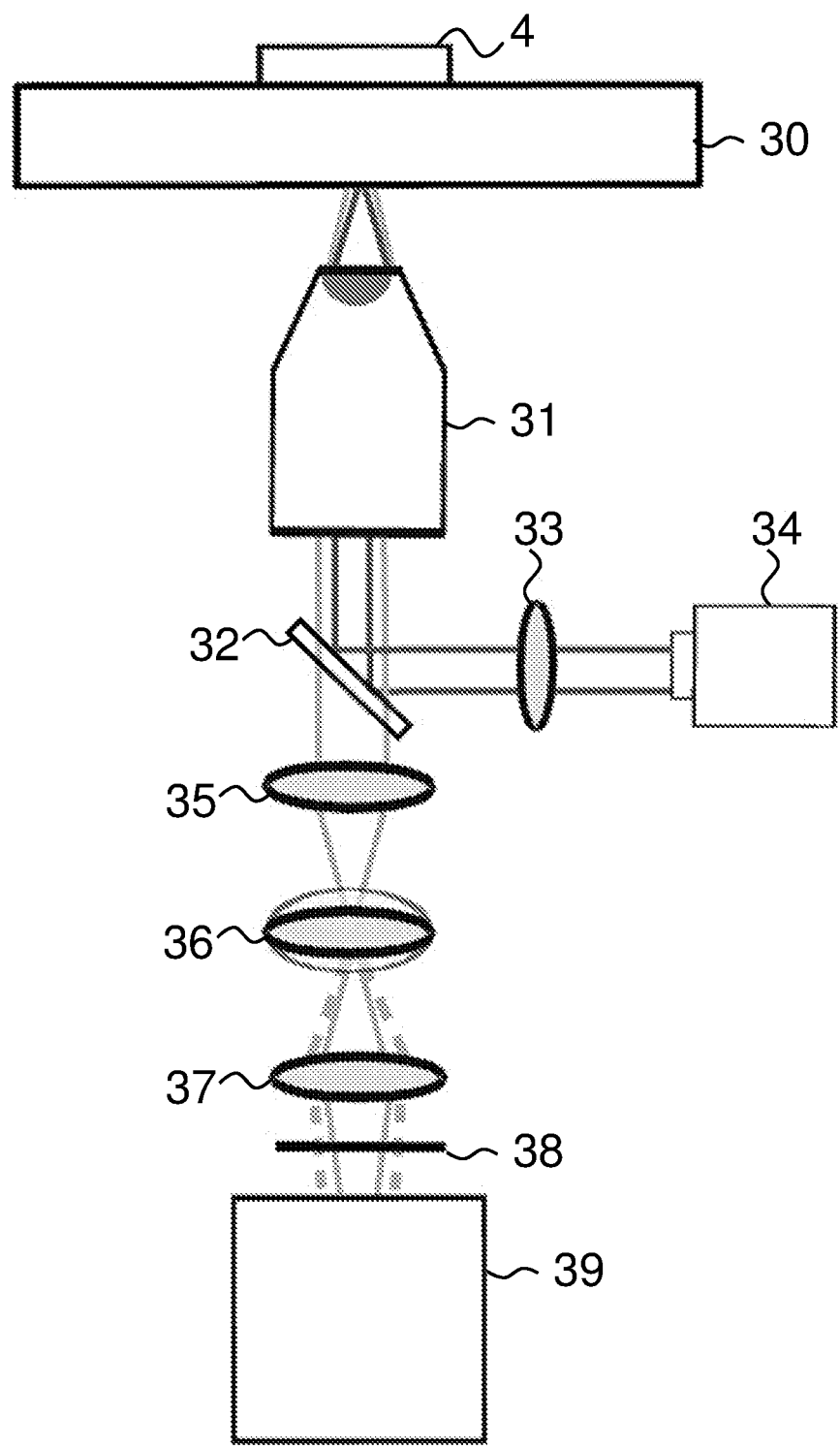
FIG. 9 is a possible device for carrying out the method.

A preferred embodiment of the device is shown in FIG. 9. The device in this figure is a widefield inverted fluorescence microscope, but the method can be implemented also with upright microscope. The device comprises an excitation light source 34, preferably a xenon lamp, whose excitation light is gathered by a lens 33 and reflected towards an objective 31 by a dichroic mirror 32. The objective 31 receives fluorescence light generated by the sample 4, which is separated from the excitation light by the dichroic mirror 32. Therefore fluorescence light is sent to the photosensitive detector 39 by a telescope composed of two simple convex lenses 35 and 37, called as relay lenses, the tunable lens 36 being placed in the common in-focus plane of relay lenses 35 and 37. The presence of relay lenses 35 and 37 allows image deformations not to be introduced as the in-focus plane changes. Thus, the system magnification does not change as the imaged plane changes. It is possible to provide a configuration without relay lenses 35 and 37, wherein however a following image processing by software is necessary. An emission filter 38 is provided, which eliminates light reflected from the sample, interposed between telescope and detector 39. The device further comprises a control unit for the tunable lens, not shown in figure, which control unit is configured such that it generates an electrical signal with a frequency smaller than acquisition frequency, for a sequential acquisition of a stack of images placed on different in-focus planes, or it generates an electrical signal with a frequency higher than the acquisition frequency, for the sequential acquisition of a temporal series of images with extended depth of field.

In such preferred embodiment, the tunable lens has a focal length ranging from 40 to 140 mm and it can be modulated by an electrical control signal with temporal bandwidth of 1 KHz.

By changing the focal length of the tunable lens 36, the optical transfer function of the reception path changes and therefore it is possible to scan the in-focus plane of the objective 31 in the axial direction of the sample 4, such as shown by the several light beams shown in FIG. 9.

Figure 3:
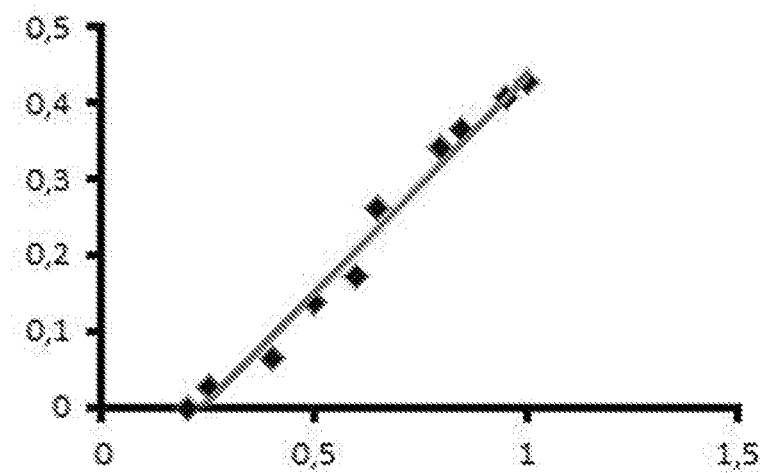
FIG. 3 is the dependence of in-focus plane from electrical control signal.

There is a linear relationship between the electrical control signal applied and the shift of the in-focus plane inside the sample 4, such as shown in FIG. 3, wherein abscissa denotes voltage intensity of the electrical signal in Volt and ordinate denotes the shift of the in-focus plane in mm.

Figure 4:
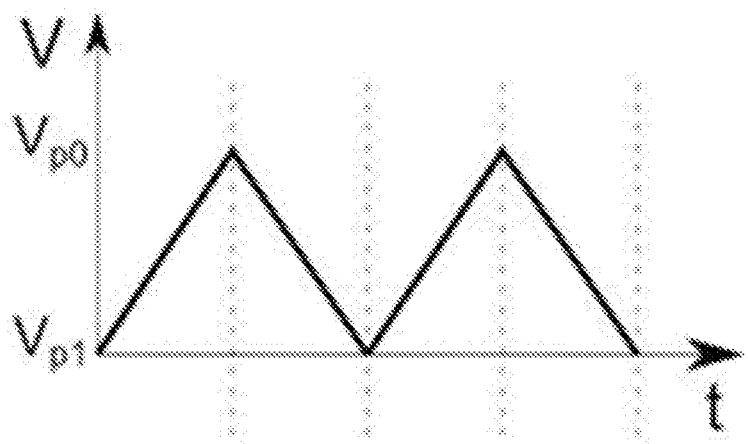
FIG. 4 is the electrical control signal.

It is possible to control the speed of the shift of the in-focus plane by changing the frequency of the control signal of the tunable lens, and the extension of the overall shift by setting limit voltage values that can be taken by the electrical signal:

$$\text{Speed}_{shift\text{-}focus} = (p_0 - p_1) \cdot \text{frequency}_{signal\text{-}control}$$

where $p_0$ and $p_1$ are the start and end points of the shift of the in-focus plane, which can be selected arbitrarily by setting the limit values of maximum and minimum voltage $V_{p0}$ and $V_{p1}$ of the electrical control signal. The electrical control signal is visible in FIG. 4, wherein a graph is shown with time as abscissa and signal voltage as ordinate, and preferably it is a sawtooth wave ranging between the limit voltage values $V_{p0}$ and $V_{p1}$. Values $p_0$ and $p_1$ can be arbitrarily selected, for example $p_0 = 0$ μm and $p_1 = 300$ μm.

The method can be performed by a microscopy device comprising a photosensitive detector. Such detector preferably is a two-dimensional detector configured for receiving a pixel array, such as a CCD 39.

Image acquisition by the photosensitive detector 39 is synchronized with the axial shift produced by the tunable lens 36, such to operate in two conditions.

Figure 1:
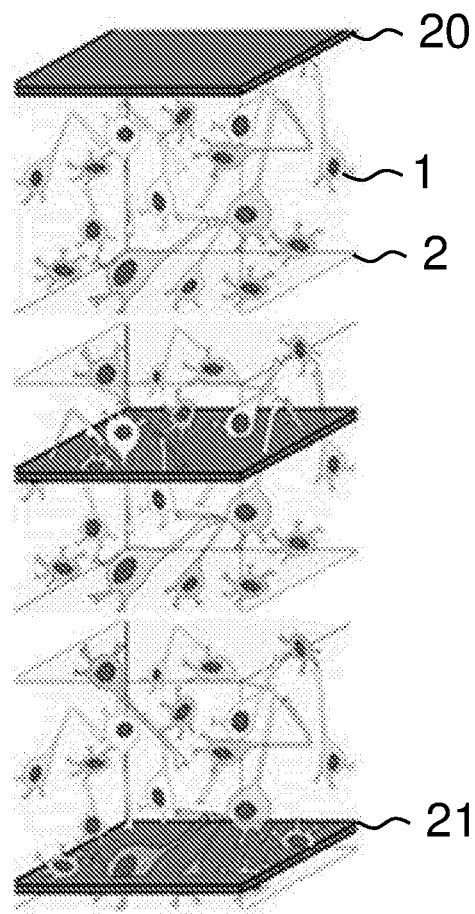
FIG. 1 is slow scanning.

In the first condition the focal length of the tunable lens is slowly changed to gather a plurality of images during the slow axial imaging of sample 4, and to obtain a series of images stacked in a z-stack 5. Such condition is shown in FIG. 1, wherein the sample 4 under examination has regions of interest, particularly cells 1, in the case of the figure neurons. In this arrangement, the acquisition frequency or frame rate of the photosensitive detector 39 is more rapid than the electrical control signal of the tunable lens 36. By shifting the in-focus plane 2 in axial direction from the axial position $p_0$ corresponding to the limit plane 20 to the axial position $p_1$ corresponding to the limit plane 21 with speed $V_{shift} = (p_1 - p_0)/F_{shift}$, and contemporaneously acquiring images with frequency $F_{CCD}$, a number of images $N = (F_{CCD}/F_{shift})/2$ is acquired during all the axial travel (between $p_0$ and $p_1$) of the sample 4. Considering the linear relationship between the control signal and the shift of the in-focus plane 2, it is possible to determine the dimension of the axial distance $Z_{step}$ between images of the acquired stack: $Z_{step} = (p_1 - p_0)/N$.

During slow imaging the control signal may be composed at most only by a voltage ramp from $V_{p0}$ to $V_{p1}$. On the contrary, advantageously, the signal is oscillated several times between $V_{p0}$ and $V_{p1}$ during acquisition, and acquired images related to the same in-focus planes are averaged with one another to have a higher signal-to-noise ratio.

Figure 2:
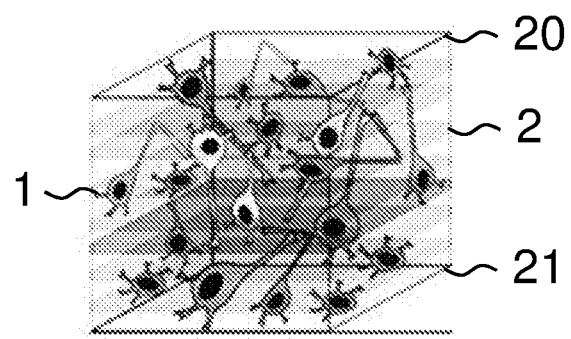
FIG. 2 is fast scanning.

In the second condition the focal length of the tunable lens 36 is rapidly changed to continuously perform to and fro movements among the limit in-focus planes during the fast axial imaging of the sample 4. In this arrangement the control signal of the tunable lens 36 is much faster than the acquisition rate of the photosensitive detector 39. The axial imaging has to be at least twice faster than the acquisition frequency, such to perform imaging of the whole axial portion of the sample during the acquisition of a single image by the detector, and therefore it allows optical signals coming from scanned planes to be contemporaneously gathered and allows them to be projected in a single acquired image. Thus, the depth of field of the microscope is extended. FIG. 2 shows such second condition, wherein the sample 4 is rapidly imaged in the axial direction by moving the in-focus plane 2 among the limit planes 20 and 21. The extension of the depth of field can be arbitrarily selected by setting the initial voltage $V_{p0}$ and final voltage $V_{p1}$ of the signal sent to the tunable lens 36, to which the axial position $p_0$ corresponding to limit plane 20 and the axial position $p_1$ corresponding to the limit plane 21 of the axial imaging correspond respectively:

Extension_depth_field=$(p_1-p_0)$

In slow imaging as of step b) a first frequency of the electrical signal and a first acquisition frequency are used, while in fast imaging as of step d) a second frequency of the electrical signal and a second acquisition frequency are used. In order to obtain alternately the different slow and fast imaging configurations it is necessary for the first acquisition frequency to be higher than the first frequency of the electrical signal and for the second acquisition frequency to be lower than the second frequency of the electrical signal. In order to obtain the above, it is possible to maintain as constant the acquisition frequency both in slow imaging and in fast imaging and to change only the frequency of the electrical signal in the two configuration or vice versa to maintain as constant the frequency of the electrical signal both in slow imaging and in fast imaging and to change only the acquisition frequency in the two configurations. A preferred embodiment operates in the two configurations on both the frequencies, such that the first and second frequencies of the electrical signal are different from each other as well as the first and second acquisition frequency.

Figure 5:
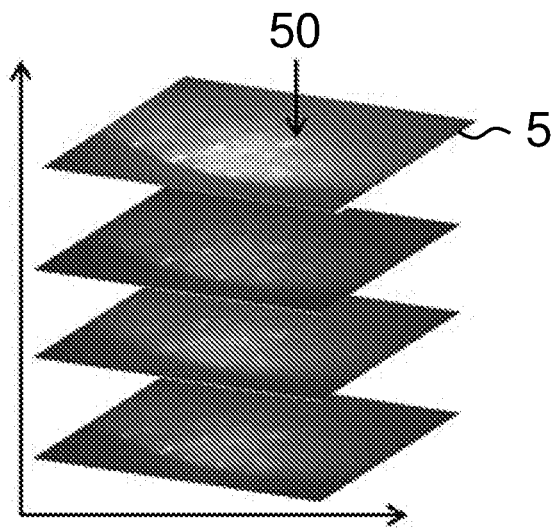
FIG. 5 is a stack of images obtained by slow scanning.
Figure 6:
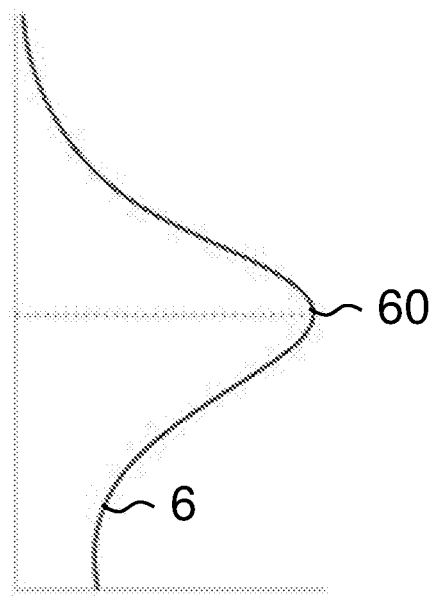
FIG. 6 is the identification of the position of the regions of interest in axial direction.
Figure 7:
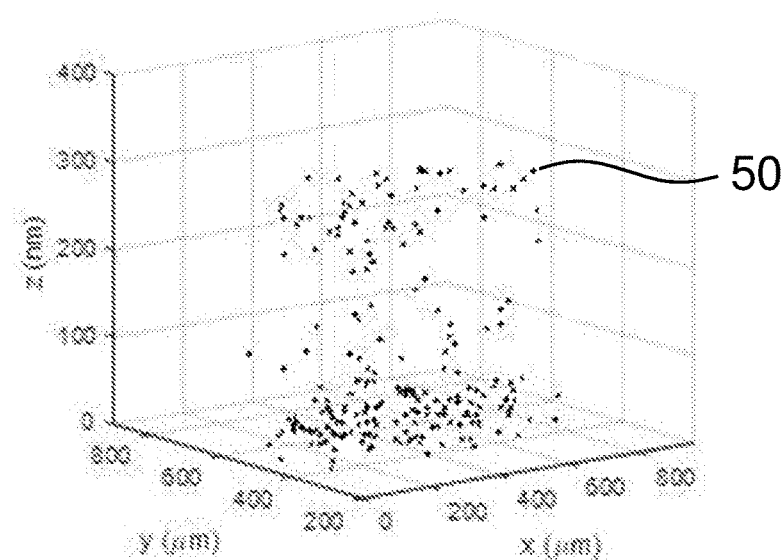
FIG. 7 is the identified position of the regions of interest in the three-dimensional space under examination of the sample.
Figure 8:
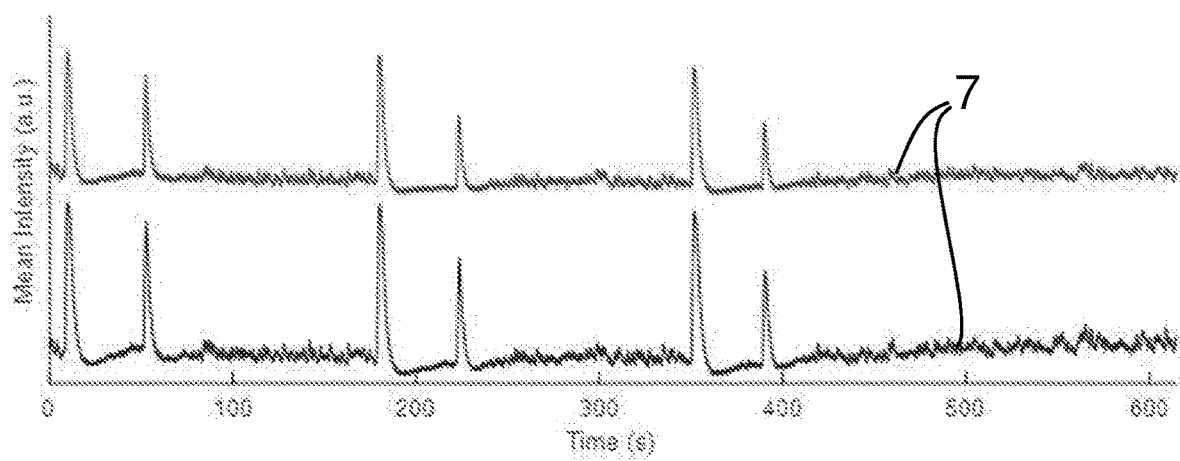
FIG. 8 is the trend over time of mean intensity of two distinct regions of interest.

One embodiment of a protocol for performing the method of the present invention is described in details below:

1. Placing the sample 4 on the stage of the microscope 30.
2. Activating the excitation light source 34 to excite the fluorescent molecules inside the sample 4.
3. Selecting a field of view (see step a) in x, y direction by moving the stage of the microscope 30, with the tunable lens 36 set in a fixed focal position, that is with a electrical control signal set as constant.
4. Maintaining the x, y position of the sample 4 selected as at step 3, and scanning the sample 4 in axial direction by slowly changing the voltage applied to the tunable lens 36. The voltage to the tunable lens 36 can be changed by any type of waveform, or manually by a voltage generator. In this step, the aim is to monitor the sample 4 in the axial direction, for selecting and setting the maximum voltage $V_{p1}$ and minimum voltage $V_{p0}$ to be applied to the tunable lens 36 and therefore for imaging the selected portion of the sample 4 in the axial direction (see steps a1, a2, a3, a4).
5. Once the position of sample 4 (x,y) and axial imaging extension (z) are selected by setting $V_{p0}$ and $V_{p1}$, acquiring an image stack 5 from CCD (see step b). A periodic waveform voltage is applied to the tunable lens 36, for scanning to and fro the sample 4 between limit positions $p_0$ and $p_1$, that are the positions selected at step 4 and corresponding to $V_{p0}$ and $V_{p1}$ respectively. In this configuration, the frequency of the signal sent to the tunable lens 36 ($F_{shift}$) is smaller than the acquisition frequency of CCD 39. The ratio $F_{CCD}/F_{shift}$ defines the number N of images acquired in the stack 5 during the axial imaging of the sample 4. The distance between subsequent images of the acquired stack 5 is defined as $Z_{step}=(p_1-p_0)/N$. During such step the electrical control signal to the tunable lens 37 and image acquisition are synchronized. The acquired image stack 5 is shown in FIG. 5.
6. Processing the stack 5 to define the position x, y, z of the features of interest 50 inside the sample portion under examination, such as shown in FIG. 7.
    6.1 Projecting the stack 5 in a single two-dimensional image by software (see step c). The projection in axial direction can be a projection of peaks, mean, slice-sum or standard deviation. The aim is to obtain the best contrast in the projection image. It is possible to possibly implement a deconvolution of the stack before producing the projection image to enhance the contrast.
    6.2 Binarization of the combined projection image by a threshold, such to automatically identify the regions of interest (see step c), and to extract x, y coordinates of the regions of interest 50 in the field.
    6.3 Calculating the mean intensity in the regions of interest 50 identified at step 6.2 for each image of the stack 5.
    6.4 Identifying, for each region of interest 50, the image of the stack 5 to which the maximum mean value of intensity corresponds (see step c3). A graph of the trend of mean intensity as the axial depth changes is shown in FIG. 6, where a peak point 60 is shown, corresponding to a region of interest 50.
    6.5 Converting the value of the control signal of the tunable lens identified as corresponding to each image with maximum mean intensity of the region of interest 50 in a space axial coordinate (see steps c1 and c2). The conversion is performed by multiplying the value of the control signal by the conversion factor obtained by the calibration, that binds the voltage signal to the shift of the in-focus plane. Therefore, the x, y, z position of each region of interest 50 identified is obtained, such as seen in FIG. 7.
7. Observing signal fluctuations of the regions of interest 50, by a time-lapse acquisition of images in extended depth of field configuration. The x, y position defined at point 1 and voltage values $V_{p0}$ and $V_{p1}$ defined at point 2 are maintained. In this configuration, the frequency $F_{shift}$ of the signal is set at a value higher than the image acquisition frequency $F_{CCD}$: $F_{shift}$ has to be at least twice the $F_{CCD}$ to image the whole axial portion of the sample 4 in a single image acquisition and therefore to integrate signals deriving from the regions of interest in an image of CCD 39 (see step e).
8. Once the frequency $F_{shift}$ of the signal is set, setting the number of images to be acquired by the CCD 39 in the temporal sequence to define the time duration of the time-lapse image acquisition.
9. After acquiring time-lapse images, calculating the mean intensity in the regions of interest 50 for each image of the temporal sequence, to extract signal fluctuations over time 7, such as shown in FIG. 8.

The method described up to now therefore aims at defining the extension of the depth of field, at identifying the x, y, z position of the features of interest, and at following signal fluctuations as a function of time of the defined features. Therefore, the method allows image acquisitions to be performed with extended depth of field on a volume of the sample arbitrarily defined, with information encoded by the axial position of the features inside the field of view.

The method can be effectively used to define the position of transfected neuronal cells 1 by a genetically encoded calcium fluorescence sensor (possibly other fluorescence probes can be used, such as for example probes sensitive to cellular membrane potential or to intracellular concentration of other ions. Moreover, the probe can be genetically encoded in cells by transfection or viral infection, or synthetic markers introduced in cells can be used). Once the position of cells is defined, it is possible to observe the fluorescence fluctuations associated to changes of the concentration of intracellular calcium of each cell inside the three-dimensional network, which fluctuations are associated to the electrophysiological activity of cells.

The system can be provided with a user interface for the automatization of image analysis and data extraction.

The invention claimed is:

1. A method of analyzing spatial and temporal information of samples using optical microscopy comprising the following steps:
   a) choosing a field of view in a sample;
   b) scanning the sample in an axial direction by applying an electrical control signal having a first frequency to an electrically tunable liquid lens placed in a detection path, performing a first sequential acquisition, at a first acquisition frequency which is higher than the first frequency of the electrical control signal, of a stack of images placed on different in-focus planes;
   c) processing the stack of images to identify a position of one or more regions of interest in a three-dimensional space under examination of the sample;
   d) scanning the sample in the axial direction by further applying the electrical signal having a second frequency to the electrically tunable liquid lens, performing a second sequential acquisition, at a second acquisition frequency which is lower than the second frequency of the electrical control signal, of a temporal series of images with extended depth of field; and
   e) calculating a mean intensity of each region of interest for each image of the temporal series, so as to set a speed for axially scanning the sample by dynamic phase modulation.

2. The method according to claim 1, wherein step c) comprises the following steps:
   c1) projecting the stack of images into a single combined image;
   c2) identifying in the single combined image the one or more regions of interest; and
   c3) calculating the mean intensity in each region of interest in each image of the stack and identifying a maximum value of the mean intensity for each region of interest.

3. The method according to claim 2, further comprising the step of generating a conversion factor from voltage values of the electrical signal to corresponding in-focus planes of a sequence of in-focus planes generated by applying the electrical control signal to the tunable lens, such that step c3) is followed by the following steps:
   c4) associating for each region of interest a maximum value of mean intensity to a corresponding voltage value of the electrical control signal; and
   c5) identifying for each region of interest an in-focus plane corresponding to the maximum value of mean intensity by applying a conversion factor to the corresponding voltage value of the electrical signal.

4. The method according to claim 2, wherein projecting the stack of images in a single combined image occurs by processing by software the stack of images.

5. The method according to claim 2, wherein identifying the one or more regions of interest in the single combined image occurs by binarization of the combined image according to a predetermined threshold.

6. The method according to claim 1, wherein step b) is preceded by a calibration step comprising the following steps:
   a1) applying the electrical control signal to the tunable lens, the electrical control signal being such that a scan of a sequence of in-focus planes is performed;
   a2) visualizing by a user the sequence of in-focus planes;
   a3) choosing by the user limit in-focus planes of the scan;
   a4) setting corresponding voltage limit values of the electrical control signal.

7. The method according to claim 1, wherein in step d) the second acquisition frequency is higher than or equal to twice the second frequency of the electrical control signal.

8. The method according to claim 1, wherein a duration of the second sequential acquisition at step d) is set with the following steps:
   d1) setting the second frequency of the electrical control signal;
   d2) setting the second acquisition frequency; and
   d3) defining a number of images with the extended depth of field of the temporal series.

9. The method according to claim 1, wherein the optical microscopy is of fluorescence type.

10. The method according to claim 1, wherein the optical microscopy is of widefield type.

* * * * *